Dec. 21, 1926.  
G. H. JUDIA  
1,611,530  
AIR MOISTENER ATTACHMENT FOR INTERNAL COMBUSTION ENGINES  
Filed May 10, 1926
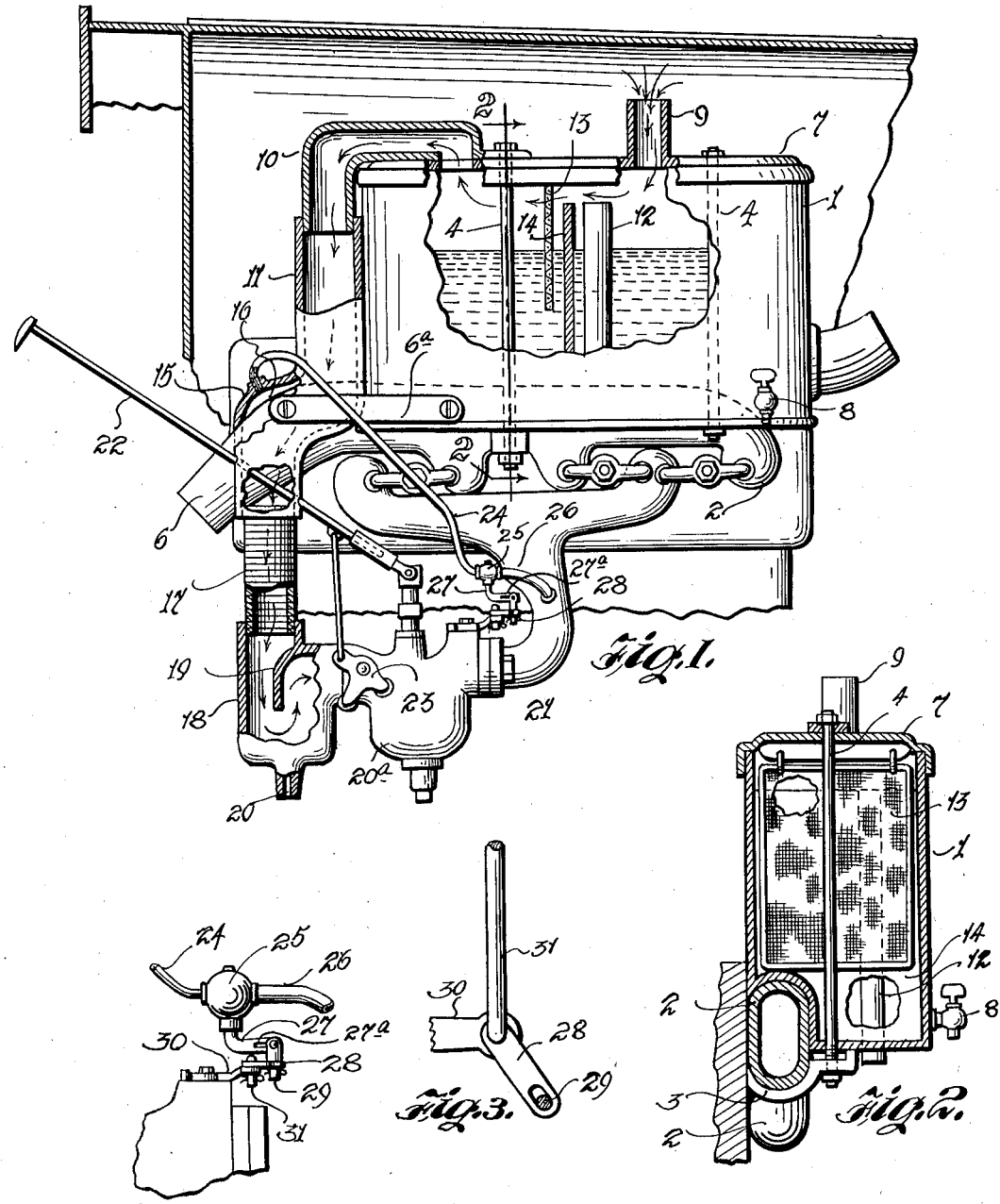
INVENTOR.  
George H. Judia  
BY John M. Spellman  
ATTORNEY.

Patented Dec. 21, 1926.

1,611,530

UNITED STATES PATENT OFFICE.

GEORGE H. JUDIA, OF CISCO, TEXAS.

AIR-MOISTENER ATTACHMENT FOR INTERNAL-COMBUSTION ENGINES.

Application filed May 10, 1926. Serial No. 107,894.

This invention relates to improvements in internal combustion engines, having more pertinent relation to an attachment for engines of this nature.

The primary object of the invention is to provide an automatic air cleaner and humidifier for the purpose of thoroughly cleaning the air fed to the engine of dirt and extraneous matter and to provide moisture in the form of steam which is fed into the fuel intake of the engine.

Another object of the invention is to provide a safety trap to prevent water from escaping into the fuel intake of the engine, and other features hereinafter explained in detail.

The invention provides generally an attachment of the nature referred to whereby the fuel such as gasolene or other commodity utilized is greatly conserved and a much greater mileage obtained than would otherwise be possible, and also eliminates undesirable elements such as dirt and carbon, in addition to excessive heat. By the use of the attachment, which is adaptable to installation on any type of internal combustion engine, there is formed a glaze on the piston rings and cylinders of the engine which eliminates wear and friction.

The invention will be clearly understood from a perusal of the following detailed description in connection with the accompanying drawings and wherein:

Figure 1 is a side view of the invention and illustrating the same in association with an exhaust manifold and carburetor of an internal combustion engine.

Figure 2 is a vertical sectional view of Figure 1, along line 2—2 thereof.

Figure 3 is a fragmentary top or plan view showing the point of connection of the superheater valve to the throttle rod of the engine; and Figure 4 is a detail fragmentary view of a portion of the carburetor and illustrating the superheater valve connection of the attachment.

Proceeding in accordance with the drawings and wherein numerals designate the various parts, 1 denotes a water reservoir for the purpose of generating vapor from the heat from the exhaust manifold indicated at 2. The reservoir 1, shown in vertical section in Figure 2, has one side shaped to conformably receive the exhaust manifold and is fastened thereto by a clamp 3 in conjunction with rods 4, and a brace rod 6ª. The exhaust manifold outlet is shown at 6.

The reservoir has a removable cover 7, and a drain cock 8. This cover has formed thereon an air inlet 9 through which air is drawn as shown by the arrows, and is directed through a neck 10 into the heater 11. The tank or reservoir is also provided with a pipe 12 to prevent overflow of the water and to maintain the water at an even level. Midway of the tank ends is a suspended screen 13 of fine mesh and a partition 14. The screen thus catches any dust, dirt or extraneous matter and prevents its entrance into the engine, such dirt being deposited in the water. The partition 14 is for the purpose of preventing the water from sloshing or moving too violently in the reservoir. The partition, however, has an opening near its bottom edge so that the water may assume an equal level on both sides thereof. This reservoir is connected to the exhaust manifold in such a manner as to receive the full heat generated therein from the exploded gases and this heat is transferred to the reservoir and heats the water.

The heater 11 forms an angle at its point of connection with the exhaust manifold but has no bottom, the sides thereof being placed directly against and upon the exhaust manifold so that the greatest amount of heat volume will be available. At its point of connection with the exhaust manifold, this heater is partly directed around the exhaust manifold. The present invention is adaptable to all makes and types of internal combustion engines, but in the drawings herein the attachment is shown operably connected to a Ford engine. In some makes of engines it may be necessary to change the shape of the heater to conform to the engine exhaust manifold, but in all applications the heater should be so arranged on the exhaust manifold that it will occupy a position near the angle of the exhaust manifold as depicted in the drawing, Figure 1, the heater in this instance occupies a position at one end of the exhaust manifold. Also it will be noticed that the heater at the point 15 projects slightly beyond the exhaust manifold, leaving a small pocket or space 16 between the inside of the heater and the outside of the exhaust manifold. This feature will be explained further as the description proceeds.

Connected to the opposite end of the heater 11 is a flexible hose 17 preferably of metal which forms a convenient means for correctly placing the heater on the exhaust manifold. In application of the attachment to this and other forms of engines and manifolds it is necessary to place the hose at an angle, hence the flexible construction thereof. This hose is attached to an overflow receptacle 18, provided in case any water should by accident escape from the reservoir 1. The receptacle has a baffle 19 and an outlet 20 with an opening of about one-sixteenth of an inch in diameter or thereabout to permit water to escape. This opening is of such a small diameter as not to materially interfere with the proper functioning of the attachment. Thus, any water deposited in the receptacle will strike the baffle 19 and cannot splash into the carburetor 20ª. The carburetor is connected to the intake manifold 21 in the usual manner.

Reference being had to Figures 1, 3 and 4, a choke rod 22 of usual construction is shown connected to the carburetor and provided with a valve 23—these parts, however, form no part of the invention, being shown for more clearly describing the same. Connected to the heater at the point 15 is a tube 24 which may be termed a superheater. This tube has its opposite end attached to a valve 25, the valve being in turn connected to the neck of the intake manifold 21, by a short length of tube 26. This valve is opened and closed by a small angular arm 27. The means for actuating the arm 27 to open and close the valve 25 is provided for by a link 28 and a finger 29—the finger being fastened to the small arm 27, and to the link 28. The arm 27 provides by means of a slot 27ª a means for adjusting the valve 25. That is, an adjustment may be made to regulate the opening and closing of the throttle in proper operative relation as desired with the opening and closing of the superheater valve. It should be here noted that wherever the word "throttle" is used in the specifications and claims, reference is made to the regular carbureter throttle.

The opposite end of the link is secured to a throttle actuating member 30 for the opening and closing of the throttle. The throttle rod running to the dash board of the vehicle is shown at 31 and is attached to the link and throttle valve actuating member 30.

In operation of the attachment, the engine is started in the customary manner and as soon as sufficient heat is generated by the exhaust manifold the water in the reservoir will take up the heat and the air entering through the inlet 9 will circulate the moist air through the heater 11. This moisture-laden air passes in the direction of the arrows to the receptacle 18, thence to the carburetor where it mixes with the gas. The result is a combination of vapor, air and gas, producing a highly explosive charge for the cylinders of the engine.

When the engine has become well heated the throttle valve is closed and simultaneously the supreheater valve is opened. No loss of power is, however, apparent, since this is taken care of by the superheater. Particular attention is now directed to this superheater. The exhaust gases in the manifold 2 striking the angular point 15 of the heater causes the heat to be cornered here and this naturally will be the hottest part of the heater. The moist air then is trapped here and produces a dry, blue steam, which by the suction of the engine cylinders is drawn through the tubes 24 and 26 into the intake manifold. At its point of entrance with the gas the steam from the superheater is forced into the intake manifold at considerable pressure and the flow of gas in the neck of the intake manifold will be divided, the steam causing a whirling movement on each side of the gas stream. Naturally, also, the heaviest portion of the gas charge will be drawn against the outer wall of the intake manifold and the lighter gases on the inside of the manifold. Behind the point of entrance of the steam therefore, the heavy and light gases are thus whirled about and thoroughly mixed with the steam. This results in the gases and steam and both heavy and light gases being thoroughly mixed and thus each cylinder receives a uniform charge of power.

The engine once well heated will run on this feed of fuel through the tubes and in connection with the gas and considerably reduce the regular consumption of fuel. On lower speeds of the engine the superheater is closed and the engine operates by means of the air through the receptacle 18 and heater as previously explained. Attention is further directed to the fact that when the throttle is closed in the ordinary manner, the engine can be run "idle" by means of the superheater connection which may then be left open.

An important advantage of the invention is that the vapor produced by the current of air is never converted into steam, but is a moist vapor, except where it passes into the superheater tube. When the vapor enters the intake manifold it is therefore capable of considerable expansion and this greatly enhances its explosive power.

An important feature of the attachment is that some carbon is burned in the explosive charge, but little of the carbon is thus accumulated on the engine parts. The action of the attachment is such as to make the carbon, oil, heat and steam form a glaze on the piston rings and cylinders eliminating wear and friction to a great extent.

It should be understood that the invention is not to be restricted to the particular construction herein shown, but may be modified in keeping with the appended claims.

What is claimed is:

1. An attachment for internal combustion engines comprising a water reservoir having an air inlet and an air outlet for directing air through the reservoir; a screen element, an overflow pipe and a partition in the reservoir; said screen for the purpose of obstructing and collecting dirt and extraneous matter carried in by the air; said partition having an opening to permit the water to be level on both sides of the partition; and said overflow pipe provided to limit the level of the water in the reservoir.

2. An attachment of the nature described in combination with the carburetor, throttle rod and manifolds of an internal combustion engine, comprising a water reservoir including a heater element, said heater element having one portion cut away to enable said element to embrace and be seated directly upon the exhaust manifold of the engine; said heater element having an angular formation providing a pocket, at its point of connection with said exhaust manifold; a tubular element connecting said pocket to the intake manifold of the engine; a valve in said tubular element, and means operably connecting said valve with the throttle rod of the engine.

3. An attachment for internal combustion engines as set out in claim 2, and wherein said heater has a pocket disposed at an angle of the exhaust manifold to receive the greatest amount of heat caused by the angular deflection of the flow of gases in the exhaust manifold; the moist air from the reservoir being trapped in said pocket and converted into dry blue steam and directed through said tubular element to the air intake of the carbureter.

4. An attachment for internal combustion engines in combination with the carburetor, intake and exhaust manifolds comprising a water reservoir, a heater connected thereto, said reservoir and heater seated upon the exhaust manifold; a water trap connected to said heater and including a baffle and an outlet, said trap connected to the carburetor; the attachment so arranged that air will be drawn into said reservoir and impregnated with moisture from the water heated by said exhaust manifold and drawn into the intake manifold of the engine.

5. An attachment as set out in claim 3, wherein said heater pocket has a tubular member including a valve, the valve connecting the tubular member to the intake manifold; said valve having means of connection to the throttle rod of the engine; said valve providing a means for directing dry blue steam generated in said pocket to the intake manifold of the engine; said attachment adapted to be operated with said valve closed or open, and in association with said throttle rod.

6. An attachment of the character described in combination with the carburetor, throttle and manifolds of an internal combustion engine comprising a reservoir, a heater connected thereto, a pocket or cavity in the heater and a tubular element connecting said pocket or cavity to the intake manifold; a valve in said tubular element, an adjustable arm connecting said valve to the throttle rod of the engine whereby the valve and throttle may be adjusted in proper associated relation in the operation of the engine.

In testimony whereof I affix my signature.

GEORGE H. JUDIA.